(12) United States Patent
Cauley, III

(10) Patent No.: US 9,403,294 B2
(45) Date of Patent: Aug. 2, 2016

(54) METHOD OF MAKING A DROPLET-GENERATING DEVICE

(71) Applicant: Bio-Rad Laboratories, Inc., Hercules, CA (US)

(72) Inventor: Thomas H. Cauley, III, Pleasanton, CA (US)

(73) Assignee: Bio-Rad Laboratories, Inc., Hercules, CA (US)

(*) Notice: Subject to any disclaimer, the term of this patent is extended or adjusted under 35 U.S.C. 154(b) by 156 days.

(21) Appl. No.: 14/255,892

(22) Filed: Apr. 17, 2014

(65) Prior Publication Data

US 2014/0312534 A1 Oct. 23, 2014

Related U.S. Application Data

(60) Provisional application No. 61/813,137, filed on Apr. 17, 2013.

(51) Int. Cl.
| | | |
|---|---|---|
| B29C 33/38 | (2006.01) | |
| B01L 3/00 | (2006.01) | |
| B29C 33/42 | (2006.01) | |

(52) U.S. Cl.
CPC ......... B29C 33/3842 (2013.01); B29C 33/3835 (2013.01); *B01L 3/00* (2013.01); *B29C 33/42* (2013.01); *Y10T 29/49764* (2015.01); *Y10T 29/49771* (2015.01); *Y10T 29/49982* (2015.01); *Y10T 29/49989* (2015.01); *Y10T 29/49998* (2015.01)

(58) Field of Classification Search
CPC B29C 33/3842; B29C 33/3835; B29C 33/42; Y10T 29/49771; Y10T 29/49764; Y10T 29/49989; Y10T 29/49998; Y10T 29/49982; B01L 3/00

See application file for complete search history.

(56) References Cited

U.S. PATENT DOCUMENTS

| 7,618,576 B2 | 11/2009 | Staats |
|---|---|---|
| 2011/0244455 A1 | 10/2011 | Larson et al. |
| 2012/0199226 A1 | 8/2012 | Weitz et al. |

OTHER PUBLICATIONS

Blaine R. Copenheaver, Authorized Officer, Commissioner for Patents, "International Search Report" in connection with related PCT Patent Application No. PCT/US2014/034572, dated Aug. 22, 2014, 2 pages.

Blaine R. Copenheaver, Authorized Officer, Commissioner for Patents, "Written Opinion of the International Searching Authority" in connection with related PCT Patent Application No. PCT/US2014/034572, dated Aug. 22, 2014, 11 pages.

*Primary Examiner* — John C Hong
(74) *Attorney, Agent, or Firm* — Kolisch Hartwell, P.C.

(57) ABSTRACT

Method of making a droplet-generating device. In the method, a first droplet-generating device may be produced. The first droplet-generating device may include a molded portion created at least in part with a mold and also may include a plurality of droplet generators each formed at least in part by the molded portion. A set of droplets may be generated with each of one or more of the droplet generators. A property of at least one set of generated droplets may be determined. The mold may be modified based on the property. A second droplet-generating device may be produced that includes a molded portion created at least in part with the modified mold.

26 Claims, 6 Drawing Sheets

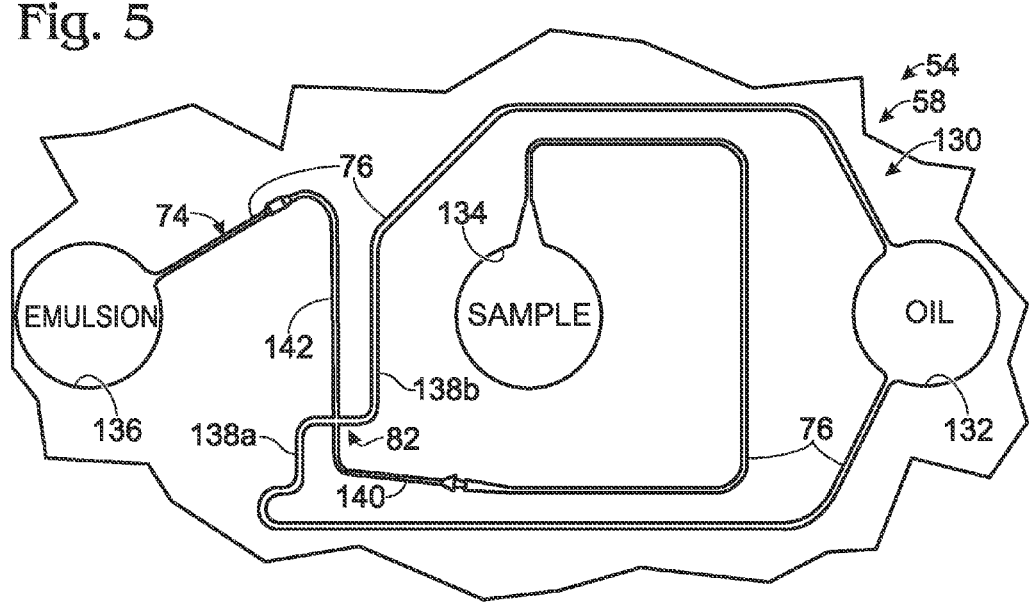
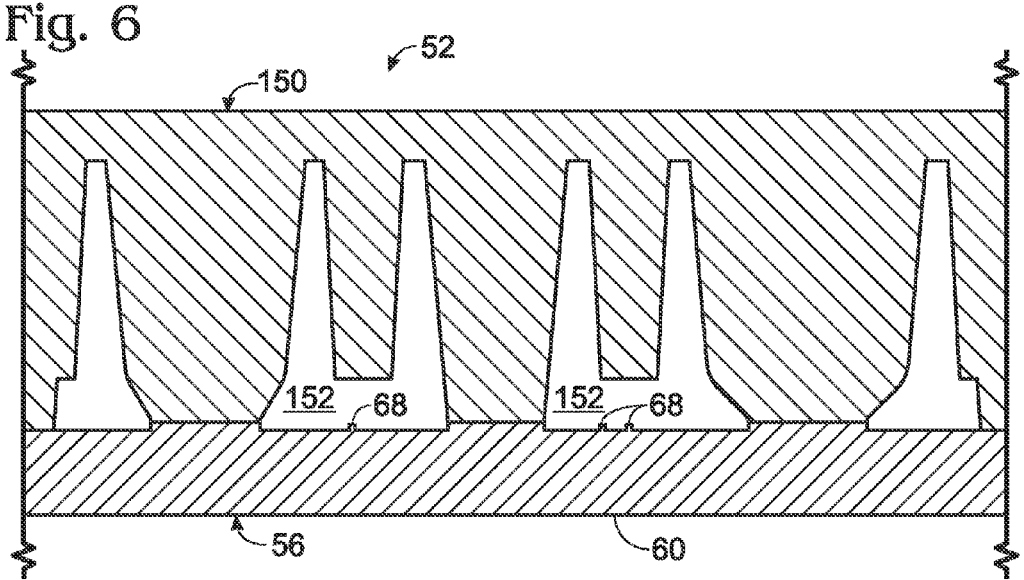

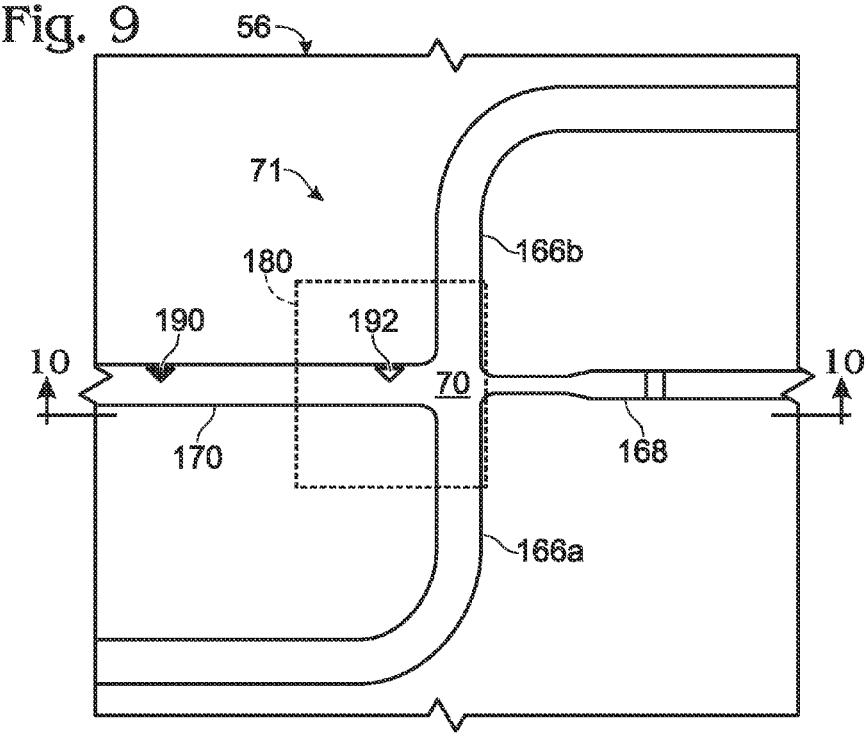
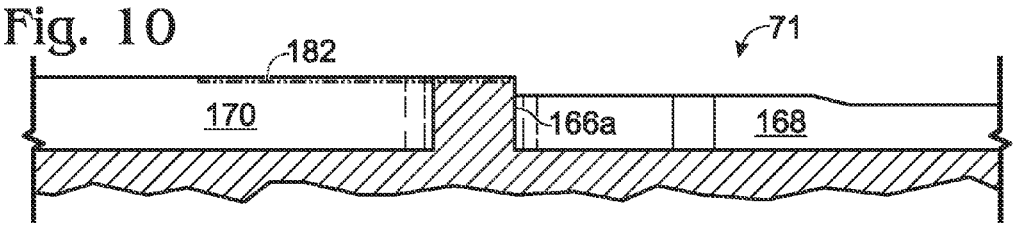
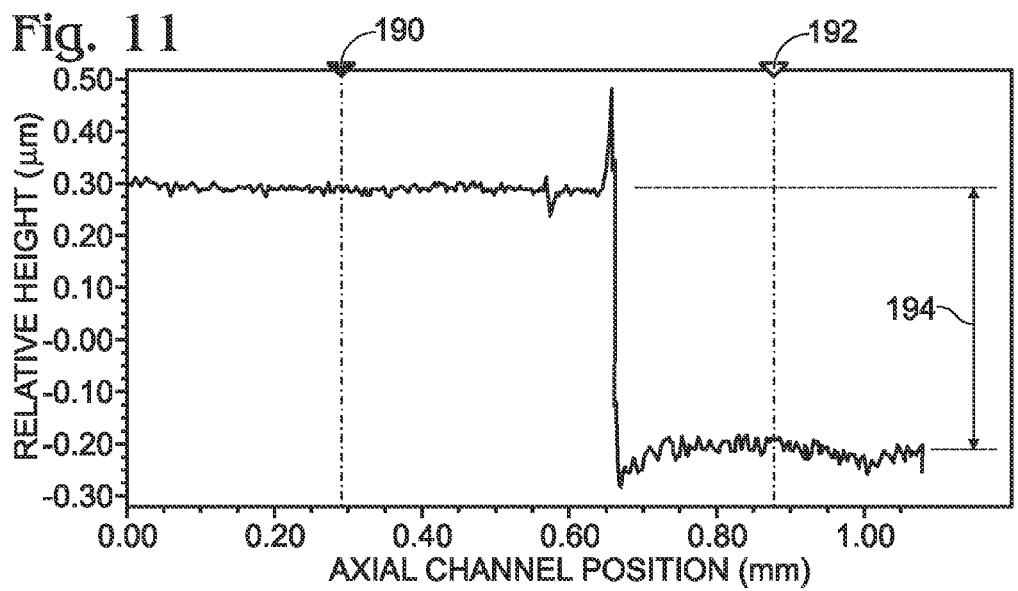

METHOD OF MAKING A DROPLET-GENERATING DEVICE

CROSS-REFERENCE TO PRIORITY APPLICATION

This application is based upon and claims the benefit under 35 U.S.C. §119(e) of U.S. Provisional Patent Application Ser. No. 61/813,137, filed Apr. 17, 2013, which is incorporated herein by reference in its entirety for all purposes.

CROSS-REFERENCES TO OTHER MATERIALS

This application incorporates by reference in their entireties for all purposes the following materials: U.S. Pat. No. 7,041,481, issued May 9, 2006; U.S. Patent Application Publication No. 2010/0173394 A1, published Jul. 8, 2010; U.S. Patent Application Publication No. 2011/0217712 A1, published Sep. 8, 2011; U.S. Patent Application Publication No. 2012/0152369 A1, published Jun. 21, 2012; U.S. Patent Application Publication No. 2012/0190032, published Jul. 26, 2012; U.S. Patent Application Publication No. 2012/0194805 A1, published Aug. 2, 2012; U.S. Patent Application Publication No. 2013/0269452 A1, published Oct. 17, 2013; U.S. Patent Application Publication No. 2014/0024023 A1, published Jan. 23, 2014; U.S. Patent Application Publication No. 2014/0080226 A1, published Mar. 20, 2014; U.S. patent application Ser. No. 14/171,754, filed Feb. 3, 2014; U.S. patent application Ser. No. 14/171,761, filed Feb. 3, 2014; and Joseph R. Lakowicz, PRINCIPLES OF FLUORESCENCE SPECTROSCOPY ($2^{nd}$ Ed. 1999).

INTRODUCTION

A microfluidic device can be designed to provide one or more droplet generators. Each droplet generator can generate a set of droplets from a sample-containing fluid and a carrier fluid. The droplet generator may enclose partitions of the sample-containing fluid with the carrier fluid to form an emulsion composed of sample droplets in a continuous carrier phase.

The droplet generators of the microfluidic device can be designed to generate a set of emulsions each containing monodisperse droplets of the same nominal size. However, the actual size of droplets generated by at least one of the droplet generators may be unacceptably larger or smaller than the nominal size.

SUMMARY

The present disclosure provides a method of making a droplet-generating device. In the method, a first droplet-generating device may be produced. The first droplet-generating device may include a molded portion created at least in part with a mold and also may include a plurality of droplet generators each formed at least in part by the molded portion. A set of droplets may be generated with each of one or more of the droplet generators. A property of at least one set of generated droplets may be determined. The mold may be modified based on the property. A second droplet-generating device may be produced that includes a molded portion created at least in part with the modified mold.

BRIEF DESCRIPTION OF THE DRAWINGS

FIG. 5 is a fragmentary bottom view of the molded portion of FIG. 4 showing a recessed region of a microfluidic layer of one of the emulsion production units.

FIG. 6 is a sectional view of a mold for creating the molded portion of FIG. 4, with the mold sectioned to match FIG. 3, in accordance with aspects of the present disclosure.

FIG. 9 is a fragmentary plan view of the bottom component of FIG. 7, taken generally at the region indicated at "8" in FIG. 7 around a junction region that includes a junction where the intersecting ridges of FIG. 8 meet one another.

FIG. 10 is a sectional view of the bottom component of FIG. 7, taken generally along line 10-10 of FIG. 9.

FIG. 11 is a graph of height data collected from one of the intersecting ridges in the junction region of FIG. 9, along a line extending through points identified by a filled triangle and an open triangle in FIG. 9, after removal of 0.5 micron of material from an area of the junction region that is bounded in FIG. 9 with a dashed rectangle, in accordance with aspects of the present disclosure.

DETAILED DESCRIPTION

Figure 1:
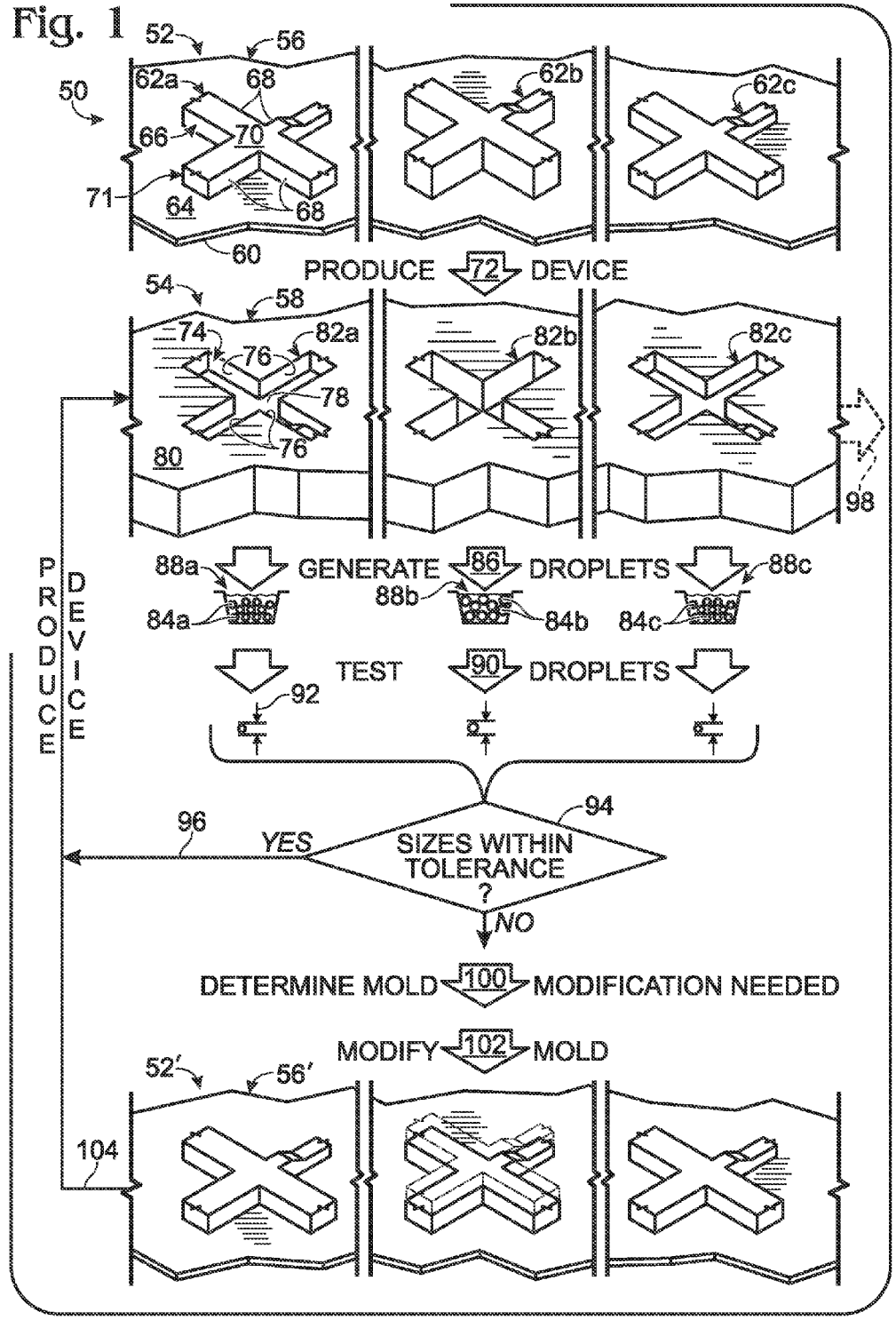
FIG. 1 is a schematic flowchart of an exemplary method of making a droplet-generating device, in accordance with aspects of the present disclosure.

The present disclosure provides a method of making a droplet-generating device. In the method, a first droplet-generating device may be produced. The first droplet-generating device may include a molded portion created at least in part with a mold and also may include a plurality of droplet generators each formed at least in part by the molded portion. A set of droplets may be generated with each of one or more of the droplet generators. A property of at least one set of generated droplets may be determined. The mold may be modified based on the property. A second droplet-generating device may be produced that includes a molded portion created at least in part with the modified mold.

For some applications it is desirable to form emulsions comprising droplets that are substantially monodisperse in size. The size of droplets in an emulsion may be affected by several factors, examples of which are the geometry of the droplet generator; the sizes of the geometrical features of the droplet generator; the physical properties (density, viscosity, and the like) of the sample and carrier fluids; the presence or absence of surfactants and/or other additives that affect interfacial energies; the flow rates or velocities of the sample and carrier fluids; and the properties of the materials that are used to construct the droplet generator.

A droplet-generating device may be an at least partially molded device comprising a plurality of droplet generators, such at least 2, 4, 6, 8, 16, 24, 32, or 96 droplet generators, among others. The droplet-generating device may include microfluidic channels each having a transverse dimension of less than one millimeter.

It may be desirable that the sizes of droplets from each of a plurality of droplet generators are substantially the same. One means of obtaining consistent droplet sizes among a plurality of droplet generators is to replicate a droplet generator design throughout the plurality. A limitation of this approach is that it may be difficult to replicate geometric features across a plurality of droplet generators with sufficient fidelity to ensure that droplet size remains consistent among droplet generators. The ability to replicate features may be limited by machining tolerances of a mold or the like. To achieve consistent droplet sizes among droplet generators it may be necessary to achieve manufacturing tolerances on the order of one micron or less.

The methods disclosed herein may, for example, be used to tune the uniformity of droplet sizes between or among a plurality of droplet generators of a droplet-generating device that is molded at least in part with a mold. The same working model of the mold (or at least a component thereof) may be refined in one or more iterations and used to mold successive copies (i.e., successive generations) of the droplet-generating device (and droplet generators). In some embodiments, the methods may be used to reduce droplet size variations from a nominal droplet size between successive generations of at least one of the droplet generators. Emulsions produced by droplet generators each created at least in part with the mold may have a more consistent and comparable size of droplets. Assay results obtained from the emulsions may be directly compared to one another with greater confidence and smaller assay variation.

Further aspects of the present disclosure are described in the following sections: (I) overview of methods, and (II) examples.

I. Overview of Methods

This section describes exemplary methods of making a droplet-generating device, tuning a working model of a mold for the device, and generating sets of emulsions with successive generations of the droplet-generating device produced with the working model before and after the working model is modified. The method steps described in this section and elsewhere in the present disclosure may be performed in any suitable order, in any suitable combination, and each may be performed any suitable number of times. Also, features of physical elements (e.g., the mold(s) and device(s)) involved in any method step may be constructed as described in this section and elsewhere in the present disclosure (e.g., Section II).

FIG. 1 shows a schematic flowchart of an exemplary method 50 of tuning a mold 52 to make a droplet-generating device 54. To simplify the presentation, only fragmentary parts of a channel-shaping component 56 of the mold are shown, both before (mold 52 at the top) and after (mold 52' at the bottom) modification of a working model (i.e., the same instance) of channel-shaping component 56 to form modified component 56'. Also, FIG. 1 shows only fragmentary parts of a molded portion 58 of device 54 that are shaped by, and complementary to, regions of channel-shaping component 56.

Channel-shaping component 56 may include a base 60 and a plurality of projecting portions 62, e.g., projecting portions 62a-62c, that project from a surface 64 (e.g., a planar surface) of the base. Each projecting portion 62a-62c may include a ridge structure 66 formed by a plurality of ridges 68 and a junction 70 where the ridges meet one another (intersect). Each projecting portion (and/or ridge structure thereof) may include any suitable number of ridges that intersect at the junction, such as at least three, four, or more.

FIG. 1 depicts an artificially truncated version of each projecting portion 62a-62c, namely, only a junction region 71 of the projecting portion. The junction region may include junction 70 and any suitable longitudinal portion of each ridge 68 extending from junction 70. In FIG. 1, each ridge 68 is shown as truncated (compare with FIG. 8) to more clearly illustrate the three-dimensional structure of the junction region.

A first copy of a droplet-generating device 54 may be produced, indicated at 72, at least in part with mold 52. Each ridge structure 66 of mold 52 may define a corresponding open channel structure 74 (interchangeably termed a groove structure or a recessed structure) of molded portion 58, when the molded portion is creating by a molding process with mold 52. (Only a truncated portion of open channel structure 74 is shown to match the truncated ridge structure shown for mold 52.) Each channel structure may include a plurality of grooves 76 (interchangeably termed open channels) and an intersection 78 where the grooves meet one another. Each open channel structure may be recessed from a surface 80 of molded portion 58 (e.g., a surface formed on a top side or a bottom side of the molded portion). Surface 80 of molded portion 58 may be defined during the molding process by surface 64 of mold component 56 and may be planar.

A sealing member may be attached to surface 80 of molded portion 58, to form a fluidic seal with the surface, as part of the step of producing device 54 (see Example 1). The sealing member may complete a microfluidic layer of the device by forming closed (circumferentially-bounded) channels from grooves 76, and a droplet generator 82 (e.g., droplet generators 82a-82c) at or near the intersection where each set of channels meet one another.

An emulsion production unit may comprise a droplet generator, one or more microfluidic channels, and sources of sample and carrier fluid. The droplet generator may be used to contact sample and carrier fluids to form an emulsion and may comprise an intersection of microfluidic channels. The droplet generator may be configured as a "tee" (an intersection of three channels), a "cross" (an intersection of four channels), or other geometries useful for generation of droplets. At least one of the channels may be in fluid communication with a supply of sample fluid (e.g., an aqueous sample fluid). At least one of the channels may be in fluid communication with a supply of carrier fluid (e.g., oil). The droplet generator may be capable of contacting sample fluid in one or more of its channels with carrier fluid in one or more of its channels, with the contact occurring at or near the intersection of the channels, to form an emulsion composed of the carrier fluid as a continuous phase and the sample fluid as a dispersed phase.

Droplets 84a-84c may be generated, indicated at 86, from the corresponding droplet generators 82a-82c of device 54, to form a set of emulsions 88a-88c. The emulsions may be formed in parallel or serially, among others.

Droplets or emulsions may be generated by contacting a sample fluid (interchangeably termed a sample-containing fluid) with an immiscible carrier fluid. The sample fluid or the carrier fluid or both may comprise at least one surfactant to stabilize the emulsion. The emulsion may comprise droplets of the sample fluid enveloped in the carrier fluid. The droplets may (or may not) be substantially spherical. The size of the droplets may be characterized by a diameter, a volume, or the like. Examples of desirable droplet sizes include: microliter range (diameters on the order of 1 millimeter); nanoliter range (diameters on the order of 100 microns); picoliter range (diameters on the order of 10 microns); femtoliter range (diameters on the order of 1 micron); and the like.

Projecting portions 62a-62c of mold 52 may be formed as replicates of one another, to produce droplet generators 82a-82c that each generate droplets of substantially the same size. For example, the projecting portions may be created by selectively removing material from a surface of the mold with a mill, to recess a portion of the surface that becomes surface 64, while selectively leaving behind regions that form the ridges. An exemplary mill that is suitable is a diamond mill (e.g., a single point diamond mill) capable of milling with a precision of less than about 5, 2, or 1 micrometer, among others.

However, this milling precision may be insufficient to create droplet generators 82a-82c capable of generating the desired degree of identity of droplet sizes relative to each other. For example, the droplet size generated by the droplet generators may vary among the droplet generators over an undesirably large range, such as greater than about 1% or 2%, among others. In the schematic representation of FIG. 1, projecting portion 62b is shown as being different in size than projecting portions 62a and 62c of mold 52, which may result in production of a droplet generator 82b of device 54 that generates droplets 84b than are unacceptably larger than droplets 84a and 84c of droplet generators 82a and 82c, respectively. Tuning mold 52 can reduce the difference in droplet sizes from the droplet generators. (Any difference in size and/or shape of any region of one projecting portion 62b relative to projecting portions 62a and 62c may produce a difference in droplet size generated by the corresponding droplet generators.) The mold may be tuned such that the droplet generators each generate droplets to within 2%, 1%, or 0.5%, among others, of a desired volume.

One or more droplets from the set of droplets (i.e., the emulsion) generated by each droplet generator may be tested (e.g., measured), indicated at 90, to determine a property 92 of each set of droplets. (The property is shown schematically as the diameter of each set of droplets.) The property may correspond to the size (e.g., the volume) of droplets of each emulsion and may be an absolute or relative indicator of size.

Droplet sizes may be determined by any approach known in the art. An example of an approach for determining droplet size is microscopic and comparison with a size reference. Another exemplary approach is to label the droplets with, for example, a dye, and then to measure the amount of dye by an optical method such as fluorescence. Another exemplary approach is to measure light scattering from the droplets.

Still another exemplary approach is to determine an average level (per droplet) of a reference species in each set of droplets (i.e., each emulsion). The droplets of each emulsion may be generated with the reference species present at partial occupancy in the droplets. The term "partial occupancy" means that only a subset of the droplets of the emulsion contain at least one copy of the reference species, while the remaining droplets of the emulsion do not contain any copies of the reference species. Copies of the reference species may be randomly distributed among the droplets of the emulsion. The presence or absence of the reference species may be detected for each of a plurality of individual droplets of the emulsion. The level of the reference species then may be calculated based on a number of the droplets that are positive (or negative) for the reference species, out of the total (i.e., the fraction of droplets that are positive or the fraction of droplets that are negative for the reference species). The level may, for example, be determined with Poisson statistics, may be described as a concentration, and may be expressed as the average number of copies of the species per droplet in the emulsion.

The reference species may have a known concentration in a sample from which the droplets of an emulsion are formed. The volume of droplets in the emulsion may be inferred based on the known concentration and the level of the reference species determined for droplets of an emulsion. As a simplified example, intended only for illustration, the reference species may be known to be present in a sample at 1000 copies per microliter (1 copy per nanoliter). Droplets formed with portions of the sample may be determined to have an average of 1.0 copy per droplet from a first droplet generator and 1.1 copy per droplet from a second droplet generator. Therefore, the first droplet generator generated droplets having a volume of 1.0 nanoliter and droplets from the second droplet generator generated droplets having a volume of 1.1 nanoliter. In other cases, the determined level of the reference species can be used directly for comparing droplet sizes from distinct droplet generators, without knowing the concentration per unit volume of the reference species in the sample.

The reference species may be a nucleic acid target (interchangeably termed a target sequence). Detection of the target may include amplifying the target in droplets of the emulsion, and detecting signals from droplets to determine whether or not amplification of the target occurred on a droplet-by-droplet basis. A concentration (e.g., an average number of copies per droplet) of the reference species can be determined from each emulsion formed with droplet generators 82a-82c.

The property determined for each of one or more sets of droplets (or from each set of droplets) may be compared to a tolerance, to determine whether the property falls within or outside the tolerance, indicated at 94. If the property determined for each set falls within the limit of tolerance, the mold meets specification and may be used to produce additional copies of the molded portion of the droplet generating device, without further mold modification, indicated at 96 and 98. If, however, the property determined for each set is not within the limit of tolerance, the mold does not meet specification and may be modified (tuned) to improve its performance (or discarded if the mold cannot be tuned readily).

The tolerance may be defined by a single value (e.g., a threshold value) or a range of values (e.g., a range defined by a maximum tolerated value and a minimum tolerated value), among others. For example, the tolerance may represent a maximum size of droplet that is acceptable for any droplet generator of the device, a maximum to minimize acceptable size range for any droplet generator of the device, or a maximum tolerated variation of droplet sizes among the droplet generators of the device, among others.

A suitable modification of the mold may be determined, indicated at 100, based on the property determined for at least one set of generated droplets. Mold 52 then may be modified, indicated at 102, to form a modified mold 52' including a modified channel-shaping component 56'.

The degree/type of modification needed for each projecting portion 62a-62c may be determined based on the property determined for each corresponding set of droplets. The mold generally is modified only where the performance of a counterpart droplet generator needs to be improved. For example, in FIG. 1, droplets 84a and 84c each fall within the tolerated size range, so corresponding projecting portions 62a and 62c of mold 52 do not need to be modified further. In contrast, droplets 84b are determined to be larger than the maximum tolerated size, so corresponding projecting portion 62b of mold 52 needs to be modified to decrease the size of droplets generated by droplet generator 82b (in a new copy (the next generation) of device 54).

The degree/type of modification needed for projecting portion 62b may be determined based on the difference between the actual value determined for the property of droplets 88b and a target value (a preferred or nominal value) for the property. As an example, an amount of material to remove from (or add to) junction region 71 of projecting portion 62b may be calculated based on the magnitude of the difference between the actual and target values (see Example 3). The material may be removed from (or added to) one or more ridges adjacent the junction and/or the junction itself. In exemplary embodiments, material may be removed from (or added to) at least one carrier ridge (corresponding to a carrier channel), a droplet ridge (corresponding to a droplet channel that carries droplets away from the droplet generator), and from the junction. The material may be removed from (or added to) the top and/or a lateral side(s) of any ridge and/or the junction. Accordingly, material removal/addition may alter a height and/or a width of a region of one or more ridges and/or of the junction.

Material removal may performed by any suitable procedure. Exemplary processing steps for material removal may include mechanical machining, micromachining, laser machining, chemical etching, or a combination thereof, among others.

Material may be added by any suitable procedure. Exemplary processing steps for material addition may include forming a mask (e.g., with photoresist or plasma) that selectively masks only a region of the mold, and adding material to another region of the mold that is not masked. Material may, for example, be added to the non-masked region of the mold by chemical/physical vapor deposition, sputtering, or the like. The mask then may (or may not) be removed from the masked region before the modified mold is used in a molding process.

One or more processing steps for mold modification may be applied selectively to some or all of the plurality of replicated features within the mold to increase uniformity. For example, if a first droplet generator produces droplets that are different in size from those of a second droplet generator, the portions of the mold that produce the first droplet generator, the second droplet generator, or both, may be modified by a further processing step. Once the mold has been modified to form modified mold 52', at least one second copy (or many second copies) of the droplet-generating device may be produced with mold 52', indicated at 104. The second copy may be sold or may be used to produce emulsions, and the droplet size (or other corresponding property) of the emulsions may be determined as previously described. Accordingly, the mold may be modified iteratively, any suitable number of times, by repeating the steps of producing a droplet-generating device, generating sets of droplets, and testing sets of droplets, until the mold does not need further modification. Then, many copies of the droplet-generating device can be manufactured with the same mold.

In some embodiments, the mold may be constructed to create an array of droplet generators that each generate droplets of the same nominal size. However, since decreasing the size of generated droplets through mold tuning may be preferred over increasing the size of droplets, the initial nominal size may be slightly higher than the final size desired. For example, the initial nominal size may be at least about 0.5% or 1% greater than the final size desired, to increase the probability that each droplet generator produces droplets that are within the tolerance, or are above the final size desired if outside the tolerance.

Further aspects of droplets, emulsions, droplet generation, droplet generators, droplet-generating devices, producing droplet-generating devices, detecting signals from droplets, and assays performed with droplets, among others, are described in the references identified above under Cross-References, which are incorporated herein by reference.

II. Examples

The following examples describe selected aspects and embodiments of the present disclosure related to methods of making a droplet-generating device, methods of improving a mold for making a molded portion of a droplet-generating device, and methods of forming emulsions, among others. These examples are intended for illustration only and should not limit or define the entire scope of the present disclosure.

Example 1

Exemplary Droplet-Generating Device

This example describes an exemplary droplet-generating device 54 having a molded portion 58 that forms grooves of a microfluidic layer of channels; see FIGS. 2-5.

Figure 2:
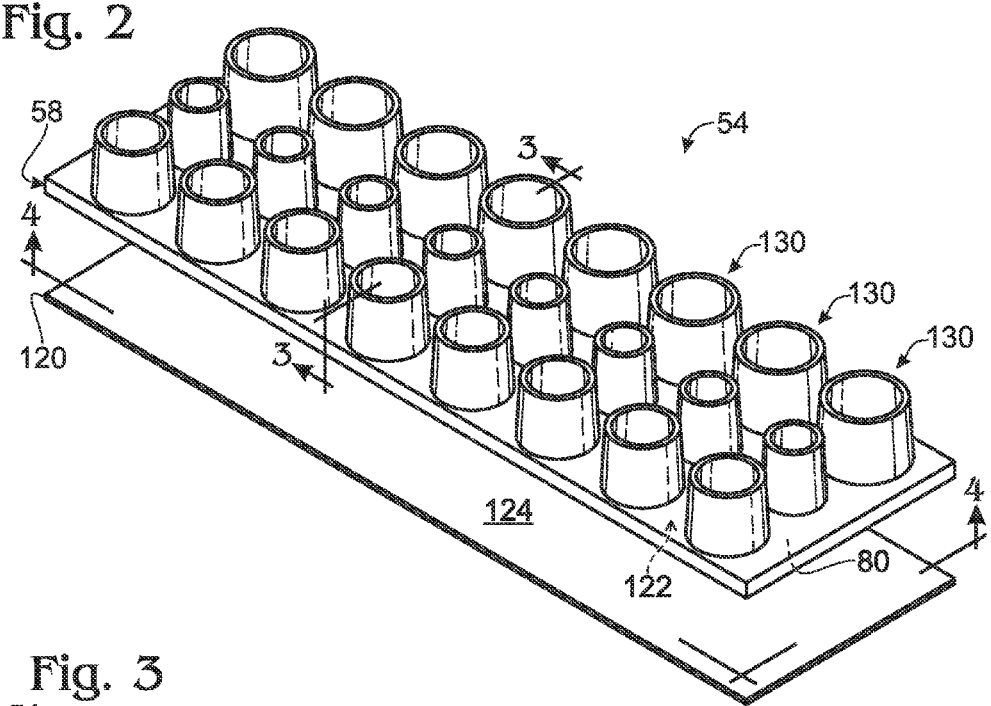
FIG. 2 is an exploded view of an exemplary droplet-generating device produced with the method of FIG. 1 and including a plurality of emulsion production units, in accordance with aspects of the present disclosure.
Figure 3:
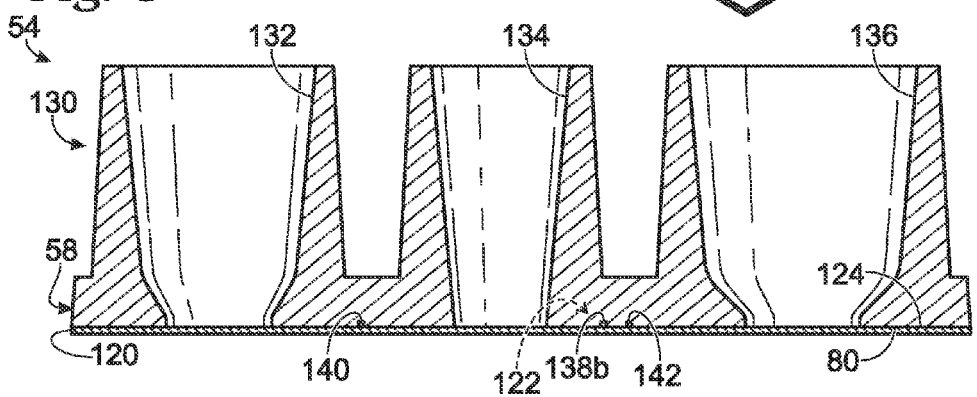
FIG. 3 is a sectional view of the droplet-generating device of FIG. 2 taken generally along line 3-3 of FIG. 2 through one of the emulsion production units of the device.

FIGS. 2 and 3 show respective exploded and assembled views of droplet-generating device 54, with molded portion 58 (interchangeably termed a substrate) separated from (FIG. 2) or attached to (FIG. 3) a sealing member 120 that cooperatively forms a microfluidic layer 122 of circumferentially-bounded channels with the molded portion. The sealing member may form a fluid-tight seal with molded portion 58 and may be attached to a surface 80 thereof. Surface 80 may be a top surface, a bottom surface, or a lateral side surface, among others, of the molded portion. The sealing member may, for example, be a sheet of material, such as a film. The sealing member may have a surface 124 that forms wall regions of the microfluidic layer, such as a wall region of each channel. In the depicted embodiment, a top surface of the sealing member forms a floor region of each channel. In other embodiments, a sealing member may be attached also or alternatively to the top side of the molded portion to form an upper wall region (such as a ceiling region) of each of a set of microfluidic channels.

Figure 4:
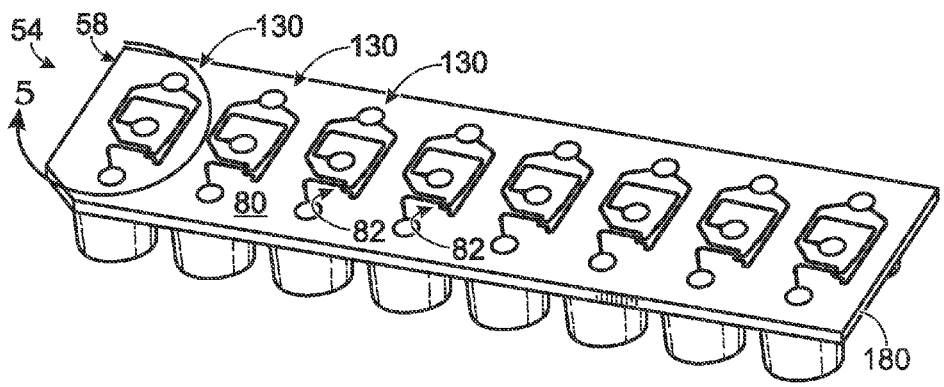
FIG. 4 is a bottom view of a molded portion of the droplet-generating device of FIG. 2.

Device 54 may include a plurality of integrally-formed emulsion production units 130 (see FIGS. 2-5). (FIG. 4 shows device 54 inverted and with sealing member 120 removed.) Each unit 130 has a droplet generator 82 formed by microfluidic layer 122 and fluidically connected to reservoirs that each supply fluid to and/or receive fluid from the droplet generator (see FIGS. 2, 4 and 5). The reservoirs may include at least one carrier well 132 and a sample well 134 that respectively supply carrier fluid and sample to the droplet generator (see FIGS. 3 and 5). The reservoirs also may include an emulsion well 136 that receives sample droplets in the carrier fluid from the droplet generator. In some embodiments, the carrier well (or other reservoir) may be shared by two or more droplet generators.

FIG. 5 shows an open channel structure 74 defined by molded portion 58 for one of units 130. Channel structure 74 includes a plurality of grooves 76. The channel structure, when closed by sealing member 120, may form droplet generator 82 and a plurality of channels each extending from one of wells 132, 134, or 136 to the droplet generator. The channels may be input and output channels, namely, at least one carrier channel, such as carrier channels 138a, 138b, a sample channel 140, and a droplet channel 142. The carrier channels direct carrier fluid to droplet generator 82, the sample channel directs sample fluid to the droplet generator, and the droplet channel directs droplets in the carrier fluid to the emulsion well.

Flow in the channels can be induced by creating a pressure differential. For example, a vacuum (negative pressure) can be applied to the emulsion well, or positive pressure can be applied to the sample and carrier wells.

Example 2

Exemplary Mold

This example describes an exemplary mold 52 for creating the molded portion of the droplet-generating device of Example 1; see FIGS. 6-10.

The mold may be constructed with geometrical features that correspond to the geometrical features desired in the molded portion of the microfluidic device. The mold may be filled with a fluid material. In the mold the fluid may be transformed to a solid by thermal, chemical, and/or any other suitable process(es). Once the material has solidified, the molded portion may be removed from the mold.

FIG. 6 shows a sectional view of mold 52 prepared to receive fluid material that will form the molded portion of the device 54. The sectional view corresponds to the sectional view of an emulsion production unit 130 in FIG. 3.

Mold 52 may include at least two parts that collectively define the shape of at least a region of molded portion of device 54. One or more or each of the parts may be described as a mold insert. The parts may provide a channel-defining component 56 (interchangeably termed a groove-defining component) and a well-defining component 150. The channel-defining component may create and be complementary to a lower (or upper) region of the molded device portion, and the well-defining component may create and be complementary to an upper (or lower) region of the molded device portion, such as a majority of each well. The mold may define a continuous void 152 that is filled with material, such as a solidifiable fluid, during the molding process. The void is bounded in part by ridges 68 that will define grooves in the molded portion of device 54 (also see FIG. 1). The mold may be configured for an injection molding process to create the molded portion of device 54.

The mold and the molded portion may have any suitable composition. In exemplary embodiments, the mold is formed of metal and the molded portion of a polymer (which may be described as a plastic). An exemplary polymer that may be suitable is a cyclic olefin polymer.

Figure 7:
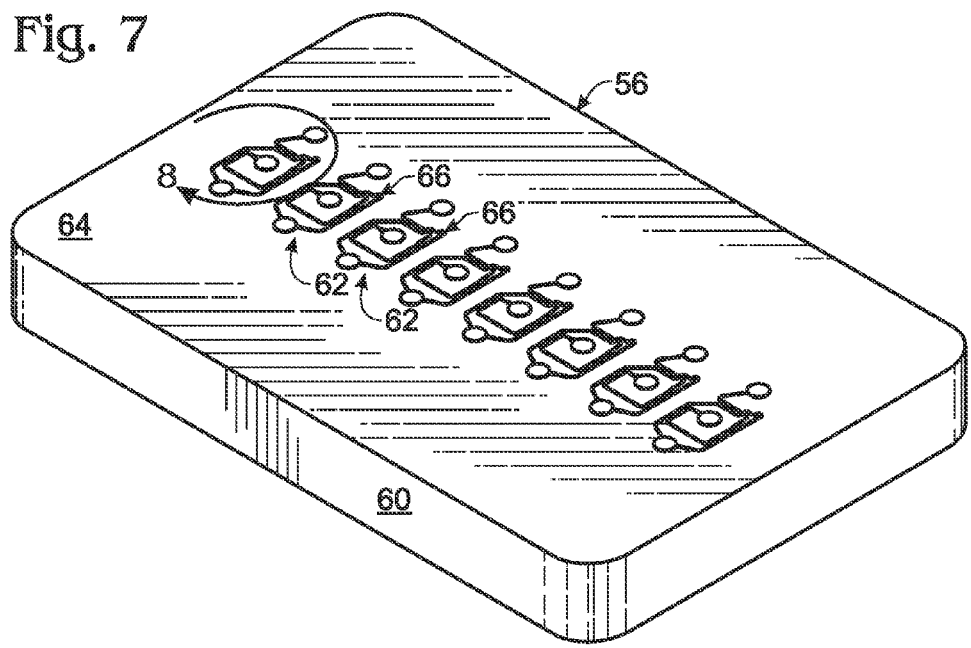
FIG. 7 is a view of a bottom component of the mold of FIG. 6.

FIG. 7 shows channel-defining component 56 taken in isolation. The component has a plurality of replicated projecting portions 62 each including a ridge structure and each elevated from a planar surface 64 of a base 60. Each projecting portion may define a molded region of an emulsion production unit 130 (see FIGS. 4 and 5). The projecting portions may be discrete from one another, as shown here, or may be continuous with one another. For example, the projecting portions may create a continuous carrier channel that is fluidically connected to each emulsion production unit. The channel-defining component may have a larger footprint than molded portion 58.

Figure 8:
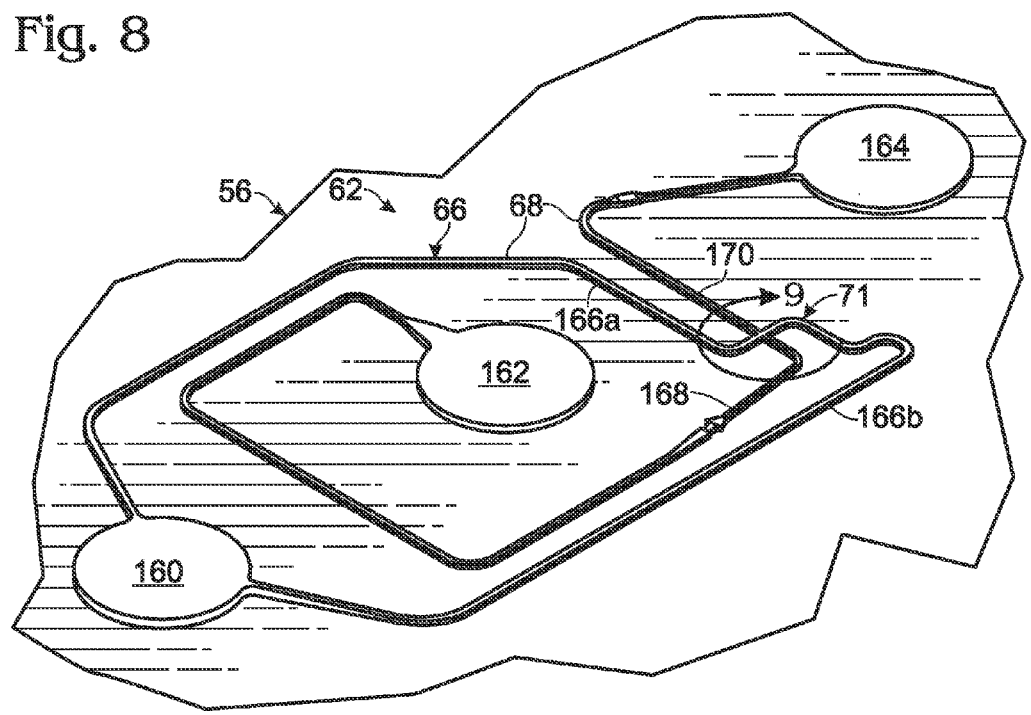
FIG. 8 is a fragmentary view of the bottom component of FIG. 7, taken generally at the region indicated at "8" in FIG. 7, with the region including a set of intersecting ridges that shape counterpart channels for the emulsion production unit of FIG. 5.

FIG. 8 shows one of projecting portions 62. The projecting portion has a carrier platform 160, a sample platform 162, and an emulsion platform 164 that create a bottom region of carrier well 132, sample well 134, and emulsion well 136, respectively, in the molding process (also see FIG. 3). Ridge structure 66 includes ridges 68 that extend from and interconnect the three platforms, and that form a junction region 71, also called a cross. Ridge structure 66 is complementary to the open channel structure of the molded portion of device 54 (compare with FIGS. 4 and 5). Ridges 68 include at least one carrier ridge, such as carrier ridges 166a and 166b, a sample ridge 168, and a droplet ridge 170.

FIG. 9 shows junction region 71 of projecting portion 62. A dashed rectangle 180 identifies an exemplary region of the junction region from which material may be removed (or added) to tune a droplet generator molded in part by the junction region. The material may be removed from any combination of junction 70, one or both carrier ridges 166a, 166b, and/or emulsion ridge 170. In some embodiments, material also or alternatively may be removed from sample ridge 168.

FIG. 10 shows a sectional view of junction region 71. A phantom line 182 schematically illustrates where material may be removed from the junction region to decrease the height of at least a portion of the junction region, to tune a droplet generator molded by the junction region. The material may be removed from a top side of the junction region, which may reduce a height of the junction region at one or more positions of the junction itself, and/or may reduce a height across and/or along at least one ridge defined by the mold. If removed from a ridge, the material may or may not be removed uniformly in a direction across the ridge. For example, material may be removed selectively from a transversely central region of the top of the ridge relative to the lateral top edges of the ridge, or vice versa.

Example 3

Exemplary Mold Modification

Figure 12:
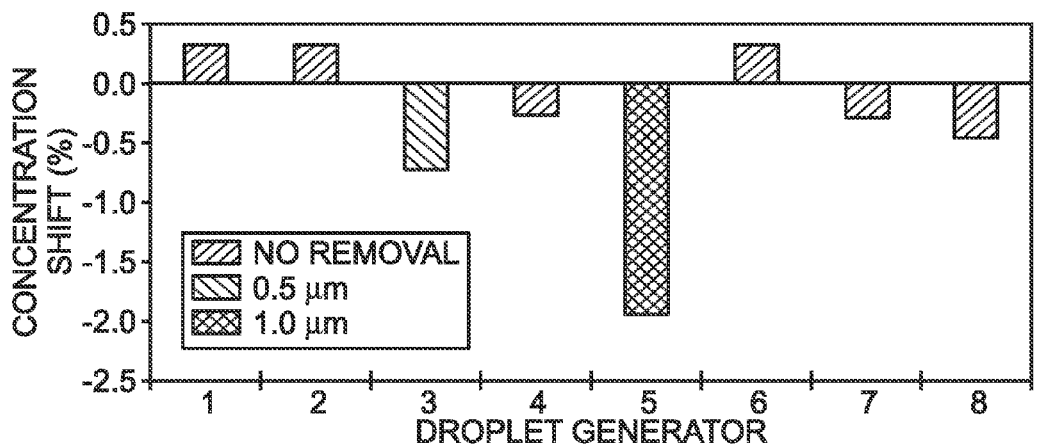
FIG. 12 is a graph of a concentration determined for a nucleic acid target from each of eight sets of droplets generated by the eight droplet generators of a working model of the droplet-generating device of FIG. 2, with the working model having a molded portion created with the mold of FIGS. 6 and 7 after selective modification of two projecting portions of the mold in a manner illustrated in FIGS. 9 and 10.
Figure 13:
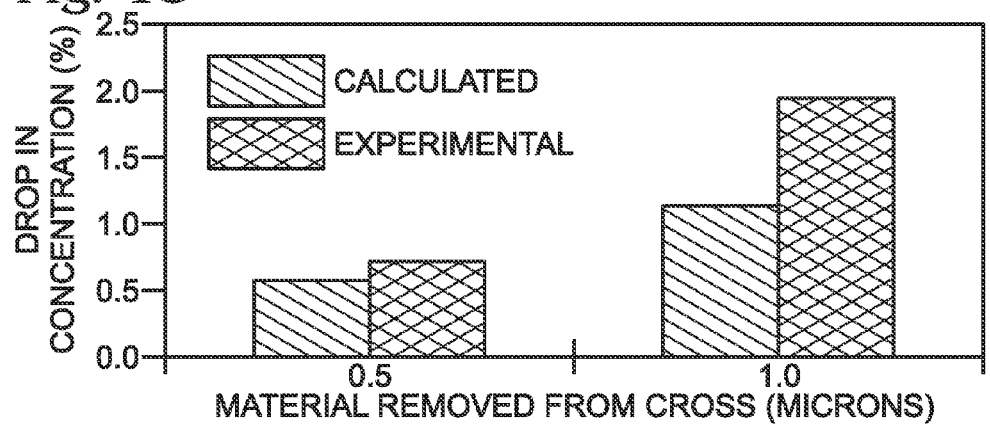
FIG. 13 is a graph of theoretical and experimentally determined changes in the concentration of the nucleic acid target for droplet generators "3" and "5" of FIG. 12.

This example describes exemplary modification of the mold of Example 2, and exemplary data collected after mold modification; see FIGS. 11-13.

FIG. 11 shows a graph of height data collected from the top of droplet ridge 170 of FIGS. 9 and 10, after removal of about 0.5 micron of material from boxed area 180 by irradiation with a laser. The data was obtained by white light interferometry (WLI) with scanning along the top of droplet ridge 170, on a straight line extending through the points identified by a closed triangle 190 and an open triangle 192 in FIG. 9. An average change 194 in height of 0.506 micron is measured.

FIG. 12 shows a graph with concentration data obtained from an assay performed to test modification of a mold. A working model of channel-defining component 56 of FIG. 7 first was constructed. Each of the eight projecting portions 62, designated in order as positions "1" through "8," were formed as substantially identical replicates. Next, laser irradiation was conducted to remove 0.5 micron and 1.0 micron of material from the top side of the junction region of two of the projecting portions (portions at positions "3" and "5," respectively, of the eight positions), within the area bounded by rectangle 180 of FIG. 9, to generate a modified mold. The modified mold then was used to produce a working model of droplet-generating device 54, with the mold creating molded portion 58 (see FIGS. 2-5) by defining the shape and shape of the molded portion. Each of the eight projecting portions 62 of the modified mold created a recessed region of one of the eight droplet generators of device 54. (The droplet generators are numbered "1" through "8" according to the position of the corresponding projecting portion that created the recessed region of the droplet generator.)

An emulsion was formed with each droplet generator from a separate volume of the same sample. The sample contained a nucleic acid target at a known concentration. The target was present at partial occupancy in the droplets of each emulsion (i.e., a subset of the droplets did not contain at least one copy of the target). The target was amplified in droplets of each emulsion using the polymerase chain reaction (PCR), in the presence of a fluorophore-labeled probe for target amplification. Fluorescence was detected from droplets of each emulsion, to determine the fraction of droplets positive for amplification of the target. A concentration (copies/droplet) of the target in each emulsion was calculated using the target-positive fraction obtained for each emulsion. The concentrations are graphed in FIG. 12 as the percent shift in measured concentration from an expected concentration for the nominal size of droplet. The droplet generators at positions "3" and "5" exhibited the largest decrease in concentration, because these droplet generators formed smaller droplets. The shift in concentration and thus the decrease in droplet volume is proportional to the depth of material removed.

FIG. 13 compares a theoretical ("calculated") concentration drop expected for droplet generators "3" and "5" of FIG. 12, based on the amount of material removed from the junction region ("the cross"), with the experimentally determined drop in target concentration observed for droplet generators "3" and "5" of FIG. 12. An algorithm that relates the amount (e.g., the depth) of material removed from the junction region to the drop in concentration (and thus the change in droplet volume) can be derived from the calculated/experimental results of FIG. 13. Accordingly, the amount of material to be removed from the junction region to achieve a desired shift in droplet size can be determined with the algorithm.

Example 4

Exemplary Parallel Droplet Generation for the Same Emulsion

Figure 14:
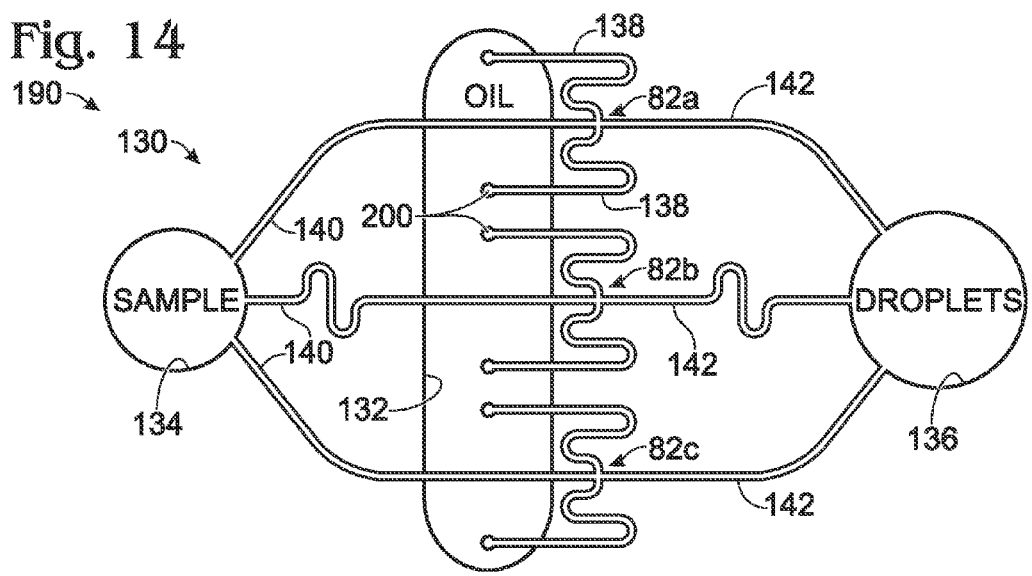
FIG. 14 is a schematic view of a droplet-generating device having a plurality of droplet generators that operate in parallel to generate droplets of the same emulsion, in accordance with aspects of the present disclosure.

This example describes an exemplary droplet-generating device 190 that may be produced with the methods of the present disclosure, with the device utilizing two or more droplet generators 82 (e.g., generators 82a-82c) that operate in parallel to generate droplets for the same emulsion; see FIG. 14.

Device 190 may include one or a plurality of emulsion production units 130 that operate to form emulsions from a sample fluid and a carrier fluid (e.g., oil). The sample fluid and the carrier fluid may be held by a sample well 134 and a carrier well 132. Each well may supply fluid to droplet generators 82a-82c. At least one distinct sample channel 140 may extend from sample well 134 to each droplet generator. A plurality of carrier channels 138 may be in fluid communication with carrier well 132 and extend to the droplet generators. (In the depicted embodiment, six carrier channels are used, two for each droplet generator.) A droplet channel 142 extends from each droplet generator to the same emulsion well 136.

Carrier well 132 may communicate with carrier channels 138 via vertical channels 200. The vertical channels allow the carrier well to be vertically offset from sample channels 140, such that the sample channels extend under (or over) the carrier well.

A mold that creates a molded portion of droplet generators 82a-82c can be tuned according to the methods of the present disclosure to provide a more uniform volume of droplets from the droplet generators.

Example 5

Selected Embodiments

This example describes selected embodiments of a method of making a droplet-generating device. The selected embodiments are presented as a series of numbered paragraphs.

1. A method for making an improved mold for microfluidic devices is disclosed, comprising the steps of: (A) making a mold; (B) producing a molded microfluidic device comprising a plurality of droplet generators using the mold; (C) generating a first set of droplets using a first droplet generator; (D) generating a second set of droplets using a second droplet generator; (E) determining a property of the first set of droplets; (F) determining a property of the second set of droplets; (G) determining a modification to the mold based on the property of the first set of droplets, the second set of droplets, or both; and (H) modifying the mold according to the modification.

2. A method for making an improved mold for microfluidic devices is disclosed, comprising the steps of: (A) making a mold; (B) producing a molded microfluidic device comprising a plurality of droplet generators using the mold; (C) generating a first set of droplets using a first droplet generator; (D) determining a property of the first set of droplets; (E) determining a modification to the mold based on the property of the first set of droplets; and (F) modifying the mold according to the modification.

3. A method for making a microfluidic device is disclosed, comprising the steps of: (A) making a mold according to paragraph 1 or paragraph 2; and (B) producing a molded microfluidic device comprising a plurality of droplet generators using the mold.

4. A method for making an emulsion is disclosed, comprising the steps of: (A) making a microfluidic device according to paragraph 3; and (B) producing an emulsion using the molded microfluidic device.

5. A method of making a droplet-generating device, the method comprising: (A) producing a first droplet-generating device including a molded portion created at least in part with a mold and also including a plurality of droplet generators each formed at least in part by the molded portion; (B) generating a set of droplets with each of one or more of the droplet generators; (C) determining a property of at least one set of generated droplets; (D) modifying the mold based on the property; and (E) producing a second droplet-generating device including a molded portion created at least in part with the modified mold.

6. The method of paragraph 5, wherein the step of determining a property includes a step of determining an average number of copies per droplet of a reference species in each set of generated droplets.

7. The method of paragraph 6, wherein the reference species is a nucleic acid target, and wherein only a subset of the droplets in each set of generated droplets contain at least one copy of the nucleic acid target.

8. The method of any of paragraphs 5 to 7, wherein the property corresponds to a volume of individual droplets of the at least one set.

9. The method of any of paragraphs 5 to 8, wherein the step of generating a set of droplets includes a step of generating a plurality of emulsions with the plurality of droplet generators, with each emulsion containing portions of a same sample.

10. The method of any of paragraphs 5 to 9, wherein the molded portion of the first droplet-generating device includes a surface and a plurality of grooves formed in the surface, wherein each of the plurality of droplet generators includes a channel intersection at which a plurality of channels meet, and wherein each of the plurality of channels is formed in part by one or more of the plurality of grooves.

11. The method of paragraph 10, wherein the surface is present on a top side or a bottom side of the molded portion of the first droplet-generating device.

12. The method of paragraph 10, wherein the step of producing a first droplet-generating device includes a step of attaching a sealing member to the surface of the molded portion of the first droplet-generating device to form circumferentially-bounded channels from the plurality of grooves.

13. The method of any of paragraphs 5 to 12, wherein the step of generating a set of droplets includes a step of generating a distinct set of droplets with each of two or more of the droplet generators, and wherein the step of determining a property includes a step of determining a property of each set of droplets generated.

14. The method of any of paragraphs 5 to 13, wherein the step of determining a property includes a step of determining a property of a distinct set of droplets generated by each of the plurality of droplet generators.

15. The method of any of paragraphs 5 to 14, wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes the second plurality of droplet generators to be configured to generate a more uniform size of droplet than the first plurality of droplet generators.

16. The method of any of paragraphs 5 to 15, wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes at least one droplet generator of the second plurality to be configured to generate a smaller size of droplet than a corresponding droplet generator of the first plurality.

17. The method of any of paragraphs 5 to 16, further comprising (a) generating a set of droplets with each of one or more droplet generators of the second droplet-generating device and (b) determining a property of least one set of droplets generated with the second droplet-generating device.

18. The method of paragraph 17, further comprising a step of modifying the modified mold if the property of least one set of droplets generated with the second droplet-generating device is outside a tolerance.

19. The method of any of paragraphs 5 to 18, wherein the mold defines a projecting portion including a plurality of intersecting ridges that create a plurality of intersecting grooves in the molded portion of the first droplet-generating device, and wherein the step of modifying the mold includes a step of removing material from the projecting portion of the mold.

20. The method of paragraph 19, wherein the projecting portion includes a junction region having a junction where two or more of the ridges meet one another, and wherein the step of removing material includes a step of decreasing a height of the junction region at one or more positions of the junction region.

21. The method of any of paragraphs 5 to 20, wherein the mold defines a projecting portion including a plurality of intersecting ridges that create a plurality of intersecting grooves in the molded portion, wherein the step of modifying the mold includes a step of changing a dimension of a region of the projecting portion, and wherein the dimension is changed by less than one micrometer.

22. The method of any of paragraphs 5 to 21, wherein the step of modifying the mold is performed at least in part with a beam of radiation.

23. The method of paragraph 22, wherein the step of modifying the mold is performed by removal of material from the mold with a laser.

24. A method of making a droplet-generating device, the method comprising: (A) producing a first droplet-generating device including a molded portion created at least in part with a mold and defining a plurality of grooves and also including a plurality of droplet generators each formed in part by an intersection of three or more of the plurality of grooves; (B) generating a set of droplets with each droplet generator; (C) determining an average number of copies per droplet of a nucleic acid target in each set of generated droplets; (D) modifying the mold based on the average number of copies determined for one or more of the sets of generated droplets; and (E) producing a second droplet-generating device including a molded portion created at least in part with the modified mold.

25. A method of making a droplet-generating device, the method comprising: (A) producing a first copy of a droplet-generating device including a molded portion created at least in part with a mold and also including a plurality of droplet generators each formed at least in part by the molded portion; (B) generating a set of droplets with each of one or more of the droplet generators; (C) determining a property of at least one set of generated droplets; (D) modifying the mold based on the property; and (E) producing a second copy of the droplet-generating device including a molded portion created at least in part with the modified mold.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:
1. A method of making a droplet-generating device, the method comprising:

producing a first droplet-generating device including a molded portion created at least in part with a mold and also including a plurality of droplet generators each formed at least in part by the molded portion;
generating a set of droplets with each of one or more of the droplet generators;
determining a property of at least one set of generated droplets;
modifying the mold based on the property; and
producing a second droplet-generating device including a molded portion created at least in part with the modified mold;
wherein the mold defines a projecting portion including a plurality of intersecting ridges that create a plurality of intersecting grooves in the molded portion, and wherein the step of modifying the mold includes a step of removing material from the projecting portion of the mold.

2. The method of claim 1, wherein the step of determining a property includes a step of determining an average number of copies per droplet of a reference species in each set of generated droplets.

3. The method of claim 2, wherein the reference species is a nucleic acid target, and wherein only a subset of the droplets in each set of generated droplets contain at least one copy of the nucleic acid target.

4. The method of claim 1, wherein the property corresponds to a volume of individual droplets of the at least one set.

5. The method of claim 1, wherein the step of generating a set of droplets includes a step of generating a plurality of emulsions with the plurality of droplet generators, with each emulsion containing portions of a same sample.

6. The method of claim 1, wherein the step of producing a first droplet-generating device includes a step of attaching a sealing member to a surface of the molded portion of the first droplet-generating device to form circumferentially-bounded channels from the plurality of intersecting grooves.

7. The method of claim 1, wherein the step of generating a set of droplets includes a step of generating a distinct set of droplets with each of two or more of the droplet generators, and wherein the step of determining a property includes a step of determining a property of each set of droplets generated.

8. The method of claim 1, wherein the step of determining a property includes a step of determining a property of a distinct set of droplets generated by each of the plurality of droplet generators.

9. The method of claim 1, wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes the second plurality of droplet generators to be configured to generate a more uniform size of droplet than the first plurality of droplet generators.

10. The method of claim 1, wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes at least one droplet generator of the second plurality to be configured to generate a smaller size of droplet than a corresponding droplet generator of the first plurality.

11. The method of claim 1, further comprising (a) generating a set of droplets with each of one or more droplet generators of the second droplet-generating device and (b) determining a property of least one set of droplets generated with the second droplet-generating device.

12. The method of claim 11, further comprising a step of modifying the modified mold if the property of least one set of droplets generated with the second droplet-generating device is outside a tolerance.

13. The method of claim 1, wherein the projecting portion includes a junction region having a junction where two or more of the ridges meet one another, and wherein the step of removing material includes a step of decreasing a height of the junction region at one or more positions of the junction region.

14. The method of claim 1, wherein the step of modifying the mold includes a step of changing a dimension of a region of the projecting portion by less than one micrometer.

15. The method of claim 1, wherein the step of removing material is performed at least in part with a beam of radiation.

16. The method of claim 15, wherein the step of removing material is performed by removal of material from the mold with a laser.

17. A method of making a droplet-generating device, the method comprising:
producing a first droplet-generating device including a molded portion created at least in part with a mold and defining a plurality of grooves and also including a plurality of droplet generators each formed in part by an intersection of three or more of the plurality of grooves;
generating a set of droplets with each droplet generator;
determining an average number of copies per droplet of a nucleic acid target in each set of generated droplets;
modifying the mold based on the average number of copies determined for one or more of the sets of generated droplets; and
producing a second droplet-generating device including a molded portion created at least in part with the modified mold.

18. A method of making a droplet-generating device, the method comprising:
producing a first droplet-generating device including a molded portion created at least in part with a mold and also including a plurality of droplet generators each formed at least in part by the molded portion;
generating a set of droplets with each of one or more of the droplet generators;
determining a property of at least one set of generated droplets;
modifying the mold based on the property; and
producing a second droplet-generating device including a molded portion created at least in part with the modified mold;
wherein the molded portion of the first droplet-generating device includes a surface and a plurality of grooves formed in the surface, wherein each of the plurality of droplet generators includes a channel intersection at which grooves of the plurality of grooves meet one another.

19. The method of claim 18, wherein the step of producing a first droplet-generating device includes a step of attaching a sealing member to the surface of the molded portion of the first droplet-generating device to form circumferentially-bounded channels from the plurality of grooves.

20. A method of making a droplet-generating device, the method comprising:
producing a first droplet-generating device including a molded portion created at least in part with a mold and also including a plurality of droplet generators each formed at least in part by the molded portion;

generating a set of droplets with each of one or more of the droplet generators;

determining a property of at least one set of generated droplets;

modifying the mold based on the property; and producing a second droplet-generating device including a molded portion created at least in part with the modified mold;

wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes the second plurality of droplet generators to be configured to generate a more uniform size of droplet than the first plurality of droplet generators.

21. A method of making a droplet-generating device, the method comprising:

producing a first droplet-generating device including a molded portion created at least in part with a mold and also including a plurality of droplet generators each formed at least in part by the molded portion;

generating a set of droplets with each of one or more of the droplet generators;

determining a property of at least one set of generated droplets;

modifying the mold based on the property; and producing a second droplet-generating device including a molded portion created at least in part with the modified mold;

wherein the first droplet-generating device has a first plurality of droplet generators, wherein the second droplet-generating device has a second plurality of droplet generators arranged in one-to-one correspondence with the first plurality of droplet generators, and wherein the step of modifying the mold causes at least one droplet generator of the second plurality to be configured to generate a smaller size of droplet than a corresponding droplet generator of the first plurality.

22. A method of making a droplet-generating device, the method comprising:

producing a first droplet-generating device including a molded portion created at least in part with a mold and also including a plurality of droplet generators each formed at least in part by the molded portion;

generating a set of droplets with each of one or more of the droplet generators;

determining a property of at least one set of generated droplets;

modifying the mold based on the property;

producing a second droplet-generating device including a molded portion created at least in part with the modified mold;

generating a set of droplets with each of one or more droplet generators of the second droplet-generating device; and determining a property of least one set of droplets generated with the second droplet-generating device.

23. The method of claim 22, further comprising a step of modifying the modified mold if the property of least one set of droplets generated with the second droplet-generating device is outside a tolerance.

24. A method of making a droplet-generating device, the method comprising:

producing a first droplet-generating device including a molded portion created at least in part with a mold and also including a plurality of droplet generators each formed at least in part by the molded portion;

generating a set of droplets with each of one or more of the droplet generators;

determining a property of at least one set of generated droplets;

modifying the mold based on the property; and producing a second droplet-generating device including a molded portion created at least in part with the modified mold;

wherein the mold defines a projecting portion including a plurality of intersecting ridges that create a plurality of intersecting grooves in the molded portion, wherein the step of modifying the mold includes a step of changing a dimension of a region of the projecting portion, and wherein the dimension is changed by less than one micrometer.

25. A method of making a droplet-generating device, the method comprising:

producing a first droplet-generating device including a molded portion created at least in part with a mold and also including a plurality of droplet generators each formed at least in part by the molded portion;

generating a set of droplets with each of one or more of the droplet generators;

determining a property of at least one set of generated droplets;

modifying the mold based on the property; and producing a second droplet-generating device including a molded portion created at least in part with the modified mold;

wherein the step of modifying the mold is performed at least in part with a beam of radiation.

26. The method of claim 25, wherein the step of modifying the mold is performed by removal of material from the mold with a laser.

* * * * *